(12) United States Patent
Burke

(10) Patent No.: US 9,860,482 B2
(45) Date of Patent: Jan. 2, 2018

(54) METHOD AND APPARATUS FOR CLASSIFYING VIDEO DATA

(71) Applicant: III HOLDINGS 10, LLC, Wilmington, DE (US)

(72) Inventor: Trevor John Burke, Wirral (GB)

(73) Assignee: III HOLDINGS 10, LLC, Wilmington, DE (US)

( * ) Notice: Subject to any disclaimer, the term of this patent is extended or adjusted under 35 U.S.C. 154(b) by 0 days.

(21) Appl. No.: 15/267,364

(22) Filed: Sep. 16, 2016

(65) Prior Publication Data

US 2017/0006254 A1    Jan. 5, 2017

Related U.S. Application Data

(63) Continuation of application No. 12/066,639, filed as application No. PCT/GB2005/003570 on Sep. 16, 2005, now Pat. No. 9,449,481.

(51) Int. Cl.
| | |
|---|---|
| *H04N 5/225* | (2006.01) |
| *H04N 5/76* | (2006.01) |
| *H04N 5/92* | (2006.01) |
| *G08B 13/196* | (2006.01) |
| *G06K 9/00* | (2006.01) |
| *G06K 9/62* | (2006.01) |
| *H04L 29/08* | (2006.01) |
| *H04N 7/18* | (2006.01) |

(52) U.S. Cl.
CPC ....... *H04N 5/9206* (2013.01); *G06K 9/00718* (2013.01); *G06K 9/00771* (2013.01); *G06K 9/6267* (2013.01); *G08B 13/19645* (2013.01); *G08B 13/19671* (2013.01); *G08B 13/19697* (2013.01); *H04L 67/12* (2013.01); *H04N 5/76* (2013.01); *H04N 7/183* (2013.01)

(58) Field of Classification Search
CPC .. H04N 5/9206; H04N 5/76; G08B 13/19645; G08B 13/19697; G08B 13/9671
See application file for complete search history.

(56) References Cited

U.S. PATENT DOCUMENTS

| 5,191,645 A | 3/1993 | Carlucci et al. |
|---|---|---|
| 5,754,258 A | 5/1998 | Hanaya et al. |
| (Continued) | | |

FOREIGN PATENT DOCUMENTS

| EP | 1 289 292 | 4/2005 |
|---|---|---|
| JP | 07-288759 | 10/1995 |
| (Continued) | | |

OTHER PUBLICATIONS

Final Office Action on U.S. Appl. No. 12/066,639, dated Nov. 22, 2011.

(Continued)

*Primary Examiner* — Lin Ye
*Assistant Examiner* — John H Morehead, III

(57) ABSTRACT

A method of classifying video data representing activity within a space to be monitored. A method comprises storing video data obtained from a camera configured to monitor the space. Sensor data indicative of a condition occurring within the space is obtained, and a plurality of program elements are defined within the video data. Each program element has an associated classification code, and each classification code is selected using the sensor data.

18 Claims, 4 Drawing Sheets

(56) References Cited

U.S. PATENT DOCUMENTS

| | | | |
|---|---|---|---|
| 7,242,295 B1* | 7/2007 | Milinusic | G08B 13/19634 340/506 |
| 7,379,628 B2* | 5/2008 | Nagaya | H04N 5/76 340/506 |
| 7,664,292 B2* | 2/2010 | van den Bergen | G06K 9/00771 348/152 |
| 7,760,230 B2* | 7/2010 | Russell | G06K 9/00288 348/143 |
| 7,847,820 B2* | 12/2010 | Vallone | G06K 9/00288 348/143 |
| 2002/0191950 A1 | 12/2002 | Wang | |
| 2003/0088872 A1 | 5/2003 | Maissel et al. | |
| 2003/0202773 A1 | 10/2003 | Dow et al. | |
| 2004/0070594 A1 | 4/2004 | Burke | |
| 2004/0247205 A1* | 12/2004 | Nagaya | H04N 5/76 382/305 |
| 2005/0122397 A1* | 6/2005 | Henson | G06K 9/00771 348/143 |
| 2005/0128318 A1 | 6/2005 | Leow et al. | |
| 2006/0078047 A1* | 4/2006 | Shu | G06F 17/3079 375/240.01 |
| 2008/0088706 A1* | 4/2008 | Girgensohn | H04N 7/181 348/207.99 |
| 2015/0168365 A1* | 6/2015 | Connor | G01N 33/02 356/51 |

FOREIGN PATENT DOCUMENTS

| | | |
|---|---|---|
| JP | 09-182037 | 7/1997 |
| JP | 2000-312316 | 11/2000 |
| WO | WO-99/03275 | 1/1999 |
| WO | WO-00/01149 | 1/2000 |
| WO | WO-2004/040473 | 5/2004 |
| WO | WO-2004/054259 | 6/2004 |

OTHER PUBLICATIONS

Non-Final Office Action on U.S. Appl. No. 12/066,639, dated Feb. 2, 2011.

Non-Final Office Action on U.S. Appl. No. 12/066,639, dated Jul. 31, 2012.

Notice of Allowance on U.S. Appl. No. 12/066,639 dated May 16, 2016.

* cited by examiner

METHOD AND APPARATUS FOR CLASSIFYING VIDEO DATA

CROSS-REFERENCE TO RELATED PATENT APPLICATIONS

This application is a Continuation of U.S. patent application Ser. No. 12/066,639, filed Jun. 9, 2008, which is a National Stage under 35 U.S.C. §371 of International Application No. PCT/GB2005/003570, filed Sep. 16, 2005, the entireties of each of which are incorporated by reference herein.

BACKGROUND

The present invention relates to a method and apparatus for classifying video data. More particularly, the invention relates to the use of sensor data to define classification codes which are applied to programme elements within the video data.

It is well known to use a video camera to capture video data, and to use that video data to monitor an area for security purposes. For example, in a simple system a video camera may constantly capture activity within a particular area, such that if it is determined that unauthorised activity has taken place, a security operative can review video data to obtain further information as to the nature of the unauthorised activity.

In more complex systems, a plurality of video cameras may be used to capture video data from different areas. In such a system, movement sensors may be used to select which of the plurality of video cameras is used to capture video data at a particular time, so as to generate a single stored stream of video data. Such systems are clearly more convenient where a large number of disparate areas are to be monitored. It is also known in the prior art to use motion and other sensors to determine the way in which a particular video camera should be activated. For example zoom and angle adopted by a particular video camera may be determined using such sensor data.

Although the known security systems described above provide a mechanism by which video data can be captured and reviewed to determine the nature of unauthorised activity, it will be appreciated that such systems are disadvantageous given that relatively large quantities of video data must be reviewed so as to accurately locate the activity of interest within the video data. If, as is usual, the video data is captured on traditional video cassettes, typically fast forward and rewind operations will be performed in a relatively random manner in an attempt to identify the correct position in the video data.

SUMMARY OF THE INVENTION

It is an object of the present invention to provide a method of classifying video data which obviates or mitigates at least some of the problems outlined above.

To assist in understanding of the invention, the term "programme element", as that term is used in this document, is used to mean a video clip. Programme elements can be classified on the basis of any criteria of interest, such as a level of activity within the video clip.

According to the present invention, there is provided, a method of classifying video data representing activity within a space to be monitored. The method comprises receiving video data from a camera configured to monitor the space. Sensor data indicative of a condition occurring within the space is also received, and a plurality of programme elements within said video data are defined. Each programme element has an associated classification code, and each classification code is selected using the sensor data. Video data representing the programme elements is stored, and the associated classification codes are also stored.

By applying classification codes based upon obtained sensor data, a classified stream of video data is created which can be easily navigated by a user so as to identify particular parts of the video data on the basis of the sensor data. Thus, the invention generates video data which can be more easily navigated.

The sensor data may be obtained using a motion sensor, a sound sensor, or a pressure sensor. Indeed, the sensor may take any suitable form. For example, in some embodiments of the invention the sensor may comprise image processing means configured to process an image and to output sensor data indicative of properties of the processed image. For example, brightness of captured images may be analysed to generate appropriate sensor data, or images may be analysed to detect movement of objects or people within the space which is being monitored.

The method may further comprise obtaining video data from a plurality of cameras, and storing data from one of said plurality of cameras selected on the basis of the sensor data. Here, a single stream of video data may be generated and at each point in time a camera recording video data indicating activity may provide the video data. The classification code associated with each programme element may identify the camera of said plurality of cameras which was used to obtain the video data making up each programme element.

The method may comprise obtaining sensor data, and storing video data if but only if said sensor data satisfies a predetermined condition.

The classification codes may be selected from a predetermined set of classification codes. The classification codes may represent values on a scale extending from a high value to a low value. The scale may represent relative activity within the space being monitored.

The method may comprise deleting video data representing some programme elements, the video data to be deleted being selected on the basis of said classification codes. The video data to be deleted may be video data representing periods of relatively low activity within the space being monitored.

The method may further comprise receiving user selection of a classification code, and displaying programme elements associated with that classification code. User input representing a request to display programme elements representing periods of relatively high activity within the space being monitored may be received, at least one classification code associated with programme elements representing periods of relatively high activity within the space being monitored may be determined, and programme elements associated with the determined classification codes may then be displayed. The determining may comprise calculating an average level of activity for all programme elements, and determining classification codes representing periods of above average activity.

According to further aspects of the present invention, there is provided a data carrier carrying computer programme code means to cause a computer to carry out the method set out above.

The invention also provides an apparatus for classifying video data representing activity within a space to be monitored. The apparatus comprises a programme memory storing processor readable instructions, and a processor configured to read and execute instructions stored in said programme memory. The processor readable instructions comprise instructions controlling the processor to carry out the method described above.

According to a further aspect of the present invention, there is provided an apparatus for classifying video data representing activity within a space to be monitored. The apparatus comprises a storage device configured to store video data obtained from a video camera configured to monitor the space, input means configured to receive sensor data indicative of a condition occurring within the space, and means for defining a plurality of programme elements within said video data each programme element having an associated classification code. The classification codes are selected using said sensor data.

The apparatus may further comprise a video camera, and may further comprise at least one sensor. The sensor may be a motion sensor, a pressure sensor or a sound sensor.

Embodiments of the present invention will now be described, by way of example, with reference to the accompanying drawings, in which:

DETAILED DESCRIPTION

Figure 1:
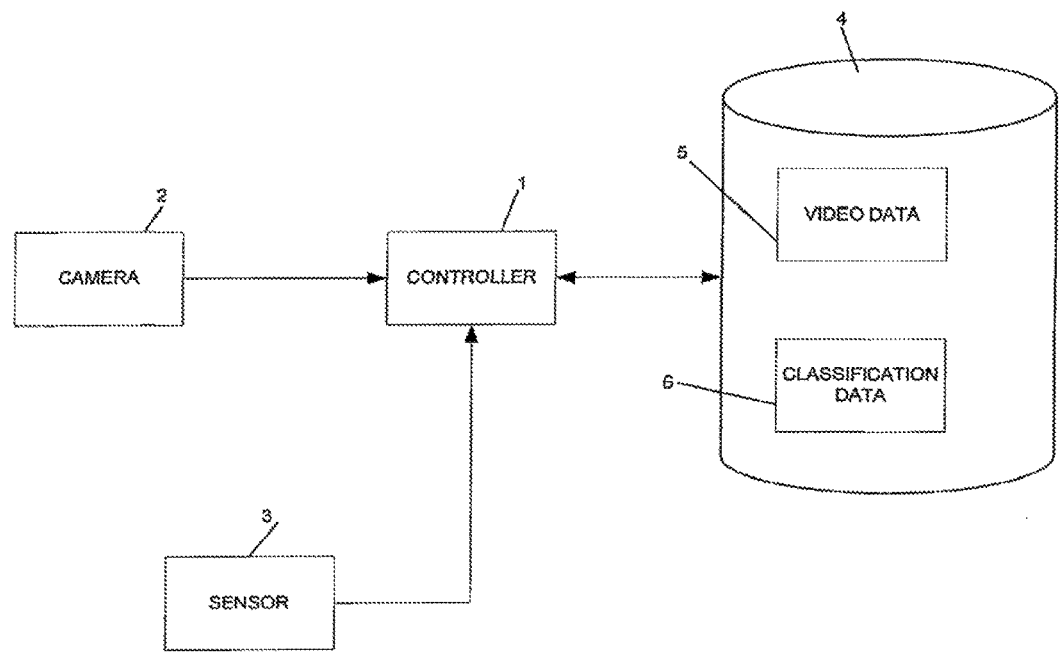
FIG. 1 is a schematic illustration of a first embodiment of the present invention.

Referring to FIG. 1, a controller 1 receives video data from a video camera 2, and sensor data from a sensor 3. In a first embodiment of the present invention, the sensor 3 is a motion sensor such as a passive infrared detector (PIR). The controller 1 is also connected to a non-volatile storage device 4 which can suitably take the form of a hard disk drive or other similar device. The controller 1 writes video data 5 and classification data 6 to the storage device 4. The classification data 6 comprises classification codes associated with programme elements comprised in the video data 5.

Figure 2:
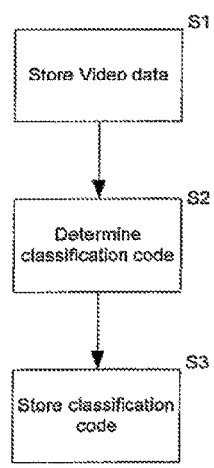
FIG. 2 is a flow chart showing an overview of operation of the system of FIG. 1.

Referring to FIG. 2, there is illustrated a flow chart providing an overview of operation of the controller 1. At step S1 the controller 1 simply passes video data received from the video camera 2 to the storage device 4, for storage as video data 5. At step S2, the controller 1 uses sensor data obtained from the sensor 3 to generate classification codes which can be applied to the video data 5. These classification codes are stored on the storage device 4 as classification data 6 (step S3).

The classification data 6 is used to identify programme elements within the video data 5 and classifies programme elements in terms of their level of activity within an area of being monitored by the video camera 2. Thus, an operator viewing the video data 5 can use the classification data 6 to identify periods of relatively high activity. This has particular value in a security system in which a security operative can quickly locate parts of the video data which perhaps relate to suspicious activity.

Figure 3:
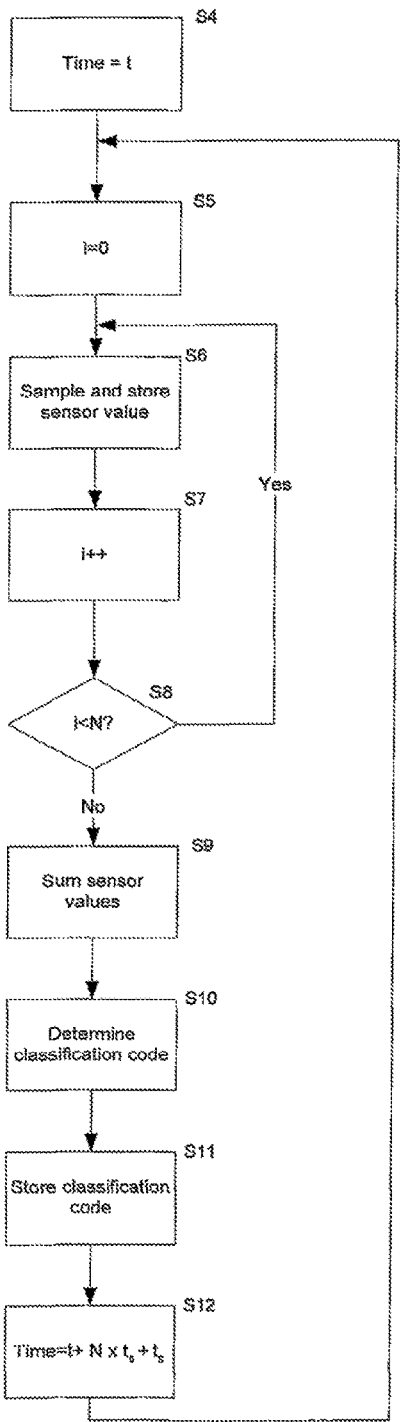
FIG. 3 is flow chart showing in more detail a method of determining classification codes in the method of FIG. 2.

Referring to FIG. 3, a method of determining classification codes carried out by the controller 1 at step S2 of FIG. 2 is illustrated. At step S4 a time parameter is initialised to t, where t is a time marker at a current position within the video data 5. At step S5 a counter variable i is initialised to zero. Steps S6, S7 and S8 are then repeated N times to obtain sensor data from the sensor 3. At each iteration of the loop, data is sampled and stored from the sensor 3 (step S6). At step S7, the counter variable i is incremented. At step S8 a check is made to determine whether the counter variable i is still less than N. If the condition of step S8 is satisfied, a further iteration of the loop is performed, and accordingly processing returns to step S6. If the condition of step S8 is not satisfied, it can be determined that N sample values have been processed and processing then passes to step S9.

In the described embodiment of the present invention, the sensor 3 outputs a binary value. That is, the sensor 3 outputs a '1' if activity is sensed, and '0' if no activity is sensed. The binary values obtained and stored at step S6 are summed at step S9. At step S10, the result of the summation of step S9 is used to determine a classification code for a programme element beginning at time t. The summation will take a value in the range 0 to N. Thus, if N+1 different classification codes are defined, the result of the summation can itself be the classification code. However, if a more limited scale is desired it will be readily apparent how the value in the range 0 to N+1 can be used to determine a classification code at step S10. The classification code determined at step S10 is stored as part of classification data 6 at step S11. The classification code can suitably be stored as part of a tuple of the form:

$$(C, N, t, t_s)$$

Where:

C is a classification code determined as described above;

N is a number of samples of sensor data obtained from the sensor 3 used to compute that classification code;

t is a time point within the video data 5 at which programme element classified using the same classification code begins; and $t_s$ is a sample time (i.e. a time interval between the capture of subsequent samples of the N sample). Using data within the tuple set out above it will be appreciated that a unique portion of the video data 5 is identified with which the classification code C is associated. That portion begins at time t and ends at time $(t+N \times t_s)$.

At step S12 the time parameter is updated according to an equation:

$$\text{Time} = (t + N \times t_s) + t_s$$

Where the parameters take the values set out above.

Processing then returns to step S5 where i is set to 0, and a classification code for a programme element beginning at time $[t+(N \times t_s)+t\ t_s]$ is determined in the manner described above.

Using the process described with reference to FIG. 3, it will be appreciated that a plurality of programme elements of equal duration are defined, each having an associated classification code. When reviewing video data classified using the process of FIG. 3 an operator can easily locate periods of relatively high activity by specifying classification codes of relatively high value to cause the controller 1 to retrieve programme elements classified using that classification code and therefore representing periods of relatively high activity.

Figure 4:
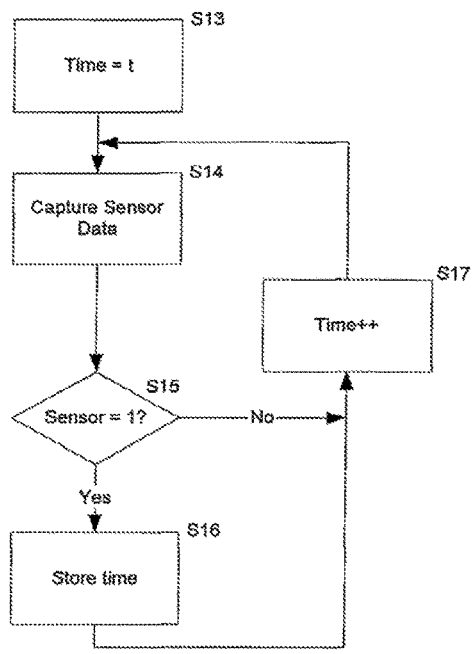
FIG. 4 is a flow chart showing an alternative method of determining classification codes in the flow chart of FIG. 2.

Referring to FIG. 4, there is illustrated an alternative process to that illustrated in FIG. 3. At step S13 a time parameter is again set to t. At step S14 sensor data from the sensor 3 is captured, and at step 15 the captured value is examined to determine whether the captured value is indicative of activity. That is, if the sensor 3 outputs binary data in the manner described above a check is made to determine whether the captured value is equal to 1. If the captured value is equal to 1 the value of the time parameter is stored in a list at step S16 the time parameter is incremented at step S17 and the process of S14 to S16 is again repeated. If activity is not detected at step S15, processing passes directly to step S17.

Using the process described with reference to FIG. 4, the classification data 6 comprises a list of time values at which the sensor 3 output is a binary '1' value. An operator viewing video data classified in this manner can then use a summation process of the type described with reference to FIG. 3 so as to determine periods of relatively high activity. It will be appreciated that storing raw sensor values as opposed to generalised classification codes allows an operator greater flexibility. Indeed, an operator may wish to view all programme elements defined by more than two sensor activations within a predetermined time period.

In the embodiments of the invention described above, the sensor 3 has been described as a motion sensor, and more particularly PIR detector. It will be appreciated that other motion detectors such as, for example, active infrared sensors are equally applicable for use in the invention. Furthermore, the sensor 3 need not be a motion sensor. In some embodiments of the present invention the sensor 3 takes the form of a microphone, and a sound level detected by the microphone is used as input to the controller 1. In such embodiments of the invention, the output of the sensor 3 may not be a binary output, but instead be an analogue value indicative of sound value measured in decibels. In such embodiments of the invention it will be readily apparent to one skilled in the art that a simple thresholding algorithm can be used so as to define binary values of the type described above. That is, if the sound level is above a predetermined value a '1' value is generated, while if the sensor output is below the predetermined value a '0' value is generated. The present invention is also applicable where the sensor 3 is a pressure sensor placed, for example, on a floor and thus detecting movement within a room.

It will also be appreciated that the sensor 3 can be a plurality of different sensors, the outputs of which are combined by the controller 1 to generate classification codes. For example a motion detector can be used to compute classification code in the manner described with reference to FIG. 3. A sound level of a microphone can then be additionally analysed as described above using a relatively high threshold. If it is the case that the detected sound level is, at any time, in excess of the high threshold a special classification code indicating suspicious activity may be applied to the video data.

The present invention is also applicable to a system in which recording by the video camera 2 is triggered by the sensor 3. Classification codes can then be applied to captured video data in the manner described above. The present invention is also applicable to systems in a plurality of video cameras monitoring different spaces, in which it is desired to record a single stream of video data. In such systems, the single stream of video data is, at any one time, generated by the output of a single video camera. This video camera from which video data is stored can suitably be selected by appropriately positioning various sensors and using this data as the basis for camera selection. In such embodiments of the invention, the classification data relating to the video data 5 can simply indicate the camera from which the appropriate video data was captured. This can be determined on the basis of which sensor triggered recording. In such embodiments of the present invention, an operator may know that suspicious activity occurred within an area monitored by a particular camera, and can use the classification data 6 to locate parts of the video data 5 which were provided by that video camera.

Figure 5:
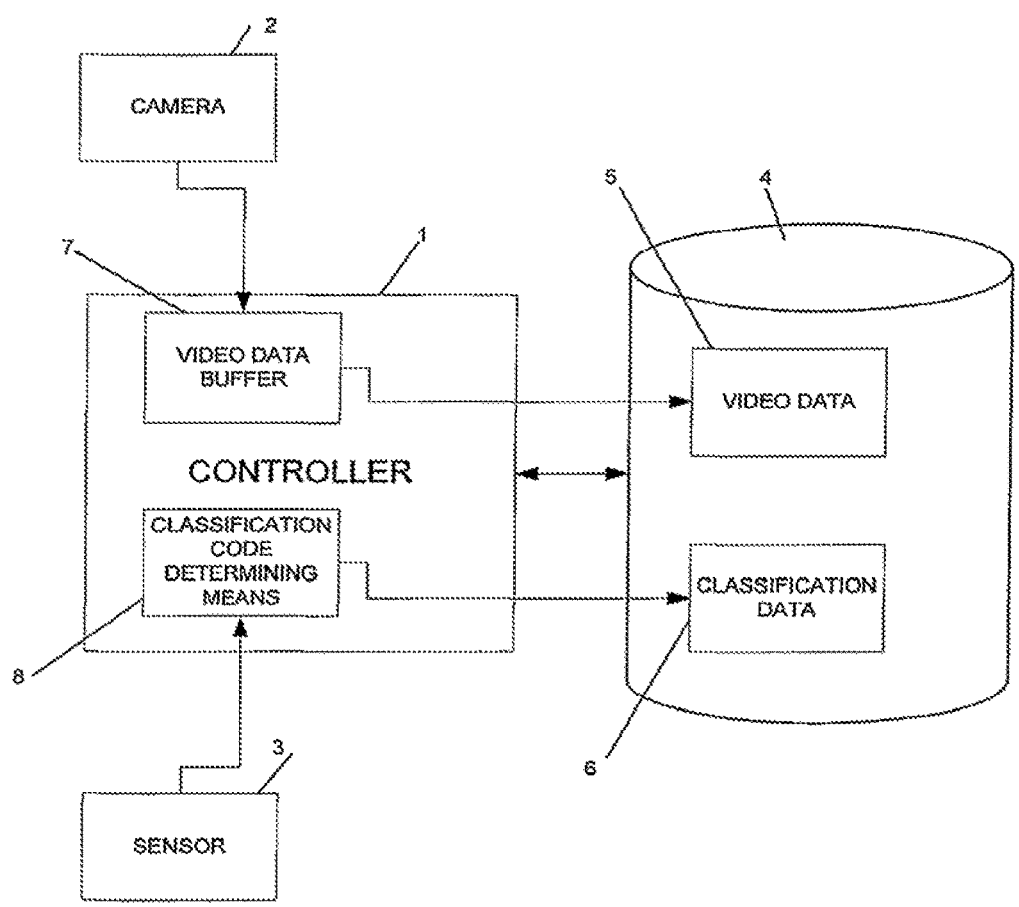
FIG. 5 is a schematic illustration of a second embodiment of the present invention.

Referring now to FIG. 5, there is illustrated a modified version of the system of FIG. 1. In the system illustrated in FIG. 5, the controller 1 comprises a video data buffer 7 and a classification code determining means 8. It can be seen that video data from the video camera 2 is passed directly to the video data buffer 7, while sensor data from the sensor 3 is passed directly to the classification code determining means 8. The classification data 6 is provided by the classification code determining means 8, and the video data 5 is provided from the video data buffer 7.

Figure 6:
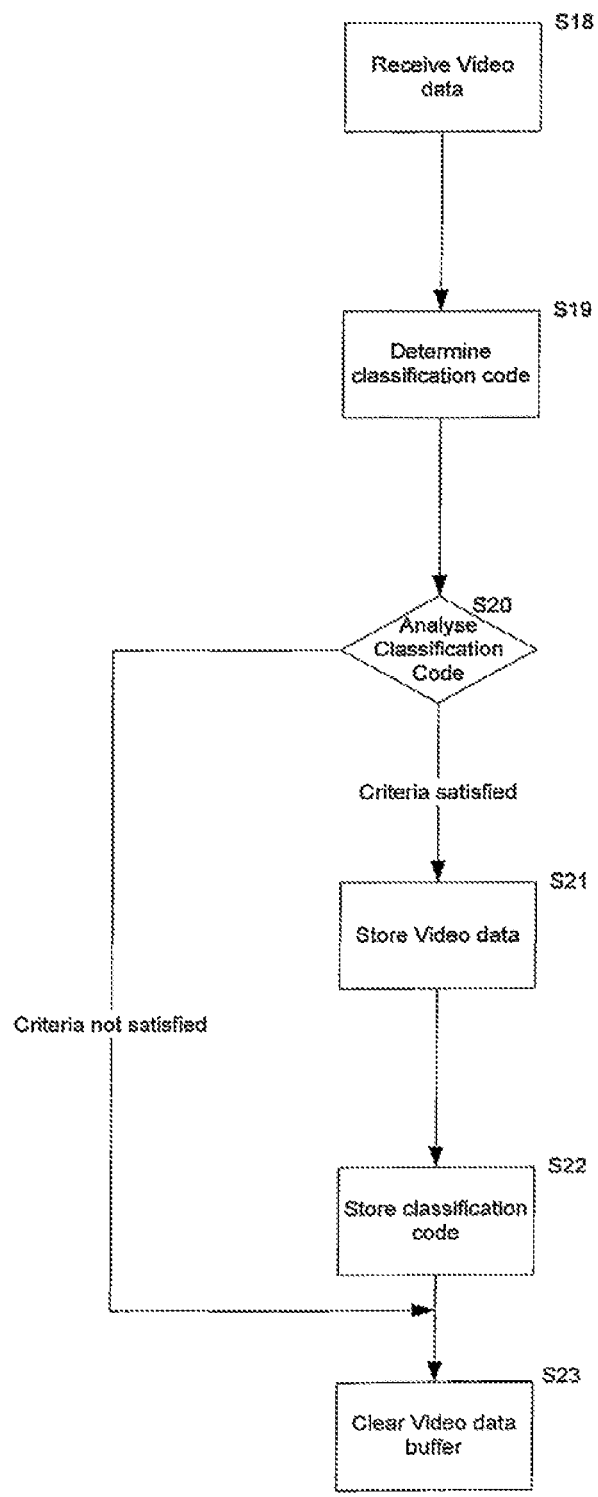
FIG. 6 is flow chart showing an overview of operation of the system of FIG. 5.

FIG. 6 illustrates an overview of operation of the system of FIG. 5. At step S18 video data is received by the buffer 7 from the video camera 2. At step S19, classification code determining means 8 determines a classification code for a portion of the video data stored in the video data buffer 7. This can conveniently be carried out using a process as illustrated in FIG. 3, and described above. At step S20, the classification code determined at step S19 is compared with a predetermined criteria. This criteria may be, for example, a predetermined level of activity. If the condition of step S20 is satisfied, processing passes to step S21 where the video data associated with the classification code generated at step S19 is written from the video data buffer 7 to the video data 5 stored on the non-volatile storage device 4. Similarly, at step S22 the classification code determined by the classification code determining means 8 is written to the classification data 6. Having copied video data from the video data buffer 7 to the video data 5, the video data buffer 7 is cleared at step S23. If the predetermined criteria of step S20 is not satisfied the video data is simply deleted from the video data buffer 7 (step S23), and is not written to the non-volatile storage device 4.

The video data buffer 7 can conveniently be implemented as a plurality of buffers arranged in parallel, each holding a different programme element. In this way, a plurality of programme elements may be stored in the video data buffer 7 before a decision is made as to whether such programme elements should be stored as part of the video data 5 stored on the non-volatile storage device 4. Each of the plurality of buffers is provided with a flag indicating whether its data can be overwritten. This flag is set when data is written to a respective buffer, and unset when data is copied to the video data 5 or a decision is taken that the programme element is not to be stored. The implementation of such a buffering arrangement will be readily apparent to one of ordinary skill in the art.

It can be seen that the embodiment of the invention as described with reference to FIGS. 5 and 6 provides a convenient mechanism for storing only portions of video data which represent periods of relatively high activity within the space to be monitored, thereby saving storage space. Video data that is stored is classified in the manner described above.

In some embodiments of the present invention, the classification data 6 may periodically be used to identify portions of the video data 5 representing periods of relatively low activity. Having identified such periods of the video data 5, this video data may be deleted so as to create more free space on the non-volatile storage device 4.

The manipulation and viewing of a classified stream of video data can be carried out using various developments made by the present applicant and described in US Patent Application publication No. US2004/0070594 (application Ser. No. 10/435,178) the contents of which are herein incorporated by reference. The adaptation of such techniques to the viewing of video data captured using the methods described above will be readily apparent.

In particular, in some embodiments of the present invention, a user may simply specify that they are interested in periods of the recorded video data 5 which represent periods of relatively high activity. On receiving such a request, the controller 1 may interrogate the classification data 6 to determine an average activity level using stored classification codes. Having determined such an average activity level classification codes representing periods of above average activity are identified, and the corresponding video data is received from the video data 5.

The embodiments of the invention described above are intended only to be examples of ways in which the present invention may be put into effect, and are in no way intended to limit the scope of the claims. Indeed, it will be readily apparent to one of ordinary skill in the art that various amendments can be made to the embodiments described above without departing from the spirit and scope of the present invention as defined by the appended claims.

What is claimed is:

1. A method of classifying video data, the method comprising:
   defining, by a computing device, a plurality of programme elements within video data, wherein each programme element has an associated classification code selected based on content of the video data, and wherein the content of the video data is determined at least in part based on sensor data obtained from a sensor device;
   storing, by the computing device, video data representing the plurality of programme elements;
   storing, by the computing device, the classification codes associated with the plurality of programme elements;
   selecting video data to be deleted based on the classification codes; and
   deleting the video data to be deleted, wherein the video data to be deleted is associated with one or more programme elements of the plurality of programme elements, wherein the video data to be deleted comprises video data representing periods of activity within the space being monitored that is below a calculated average level of activity for programme elements within the monitored space.

2. The method of claim 1, further comprising:
   receiving the video data from a video recording device configured to monitor a space; and
   receiving the sensor data from the sensor device, wherein the sensor device is configured to sense conditions occurring within the space, and wherein the sensor data is indicative of a sensed condition occurring within the space.

3. The method of claim 2, wherein the sensor data comprises motion data obtained from a motion sensor.

4. The method of claim 2, wherein the sensor data comprises audio data obtained from a sound sensor.

5. The method of claim 2, wherein the sensor data comprises pressure data obtained from a pressure sensor.

6. The method of claim 1, wherein the content of the video data is obtained by the sensor device during a time period of capture of a respective programme element by the video recording device.

7. The method of claim 1, wherein the classification codes represent values on a scale extending from a low value to a high value, and wherein the scale represents activity within the space being monitored.

8. The method of claim 1, further comprising receiving video data from a plurality of video recording devices, wherein the classification code associated with each programme element identifies a specific video recording device of the plurality of video recording devices which was used to obtain the video data of the respective programme element.

9. The method of claim 1, wherein storing video data representing the plurality of programme elements comprises:
   determining whether each classification code satisfies a predetermined condition; and
   storing a programme element in response to a determination that an associated classification code satisfies the predetermined condition.

10. The method of claim 1, wherein said classification codes are selected from a predetermined set of classification codes.

11. The method of claim 1, wherein the classification codes represent upon a number of activations of the sensor device occurring within a corresponding predetermined time period.

12. The method of claim 1, further comprising:
   receiving a user selection of a classification code; and
   displaying programme elements associated with the classification code associated with the user selection.

13. The method of claim 12, further comprising:
   receiving a user input representing a request to display programme elements representing periods of activity within the space being monitored that is above a calculated average level of activity for programme elements within the monitored space;
   determining at least one classification code associated with programme elements representing periods of activity within the space being monitored that is above a calculated average level of activity for programme elements within the monitored space; and
   displaying programme elements associated with the determined at least one classification code.

14. The method of claim 13, wherein said determining comprises:
   calculating an average level of activity for all programme elements of the plurality of programme elements; and
   determining classification codes representing periods of above activity that is at the calculated average level of activity for programme elements within the monitored space.

15. A non-transitory computer-readable memory storing computer program code to cause a computer to:
   define a plurality of programme elements within video data, wherein each programme element has an associated classification code selected based on content of the video data, and wherein the content of the video data is determined at least in part based on sensor data obtained from a sensor device;
   store video data representing the plurality of programme elements;

store the classification codes associated with the plurality of programme elements;

select video data to be deleted based on the classification codes; and delete the video data to be deleted, wherein the video data to be deleted is associated with one or more programme elements of the plurality of programme elements, wherein the video data to be deleted comprises video data representing periods of activity within the space being monitored that is below a calculated average level of activity for programme elements within the monitored space.

16. A system for classifying video data, the system comprising:

a program memory configured to store processor readable instructions; and a processor configured to read and execute instructions stored in the program memory, wherein the processor readable instructions comprise instructions to cause the processor to:

define a plurality of programme elements within video data, wherein each programme element has an associated classification code selected based on content of the video data, and wherein the content of the video data is determined at least in part based on sensor data obtained from a sensor device;

store video data representing the plurality of programme elements;

store the classification codes associated with the plurality of programme elements;

select video data to be deleted based on the classification codes; and delete the video data to be deleted, wherein the video data to be deleted is associated with one or more programme elements of the plurality of programme elements, wherein the video data to be deleted comprises video data representing periods of activity within the space being monitored that is below a calculated average level of activity for programme elements within the monitored space.

17. The system of claim 16, further comprising:

the sensor device;

a video recording device configured to capture the video data; and a storage device configured to store the video data.

18. The system of claim 17, wherein the sensor device comprises at least one of a motion sensor, a pressure sensor, and a sound sensor.

* * * * *